April 20, 1943.   E. B. MARPLE   2,317,285
FLOAT FOR AN AIRCRAFT
Filed June 15, 1942   5 Sheets-Sheet 1

INVENTOR.
ELMORE B. MARPLE

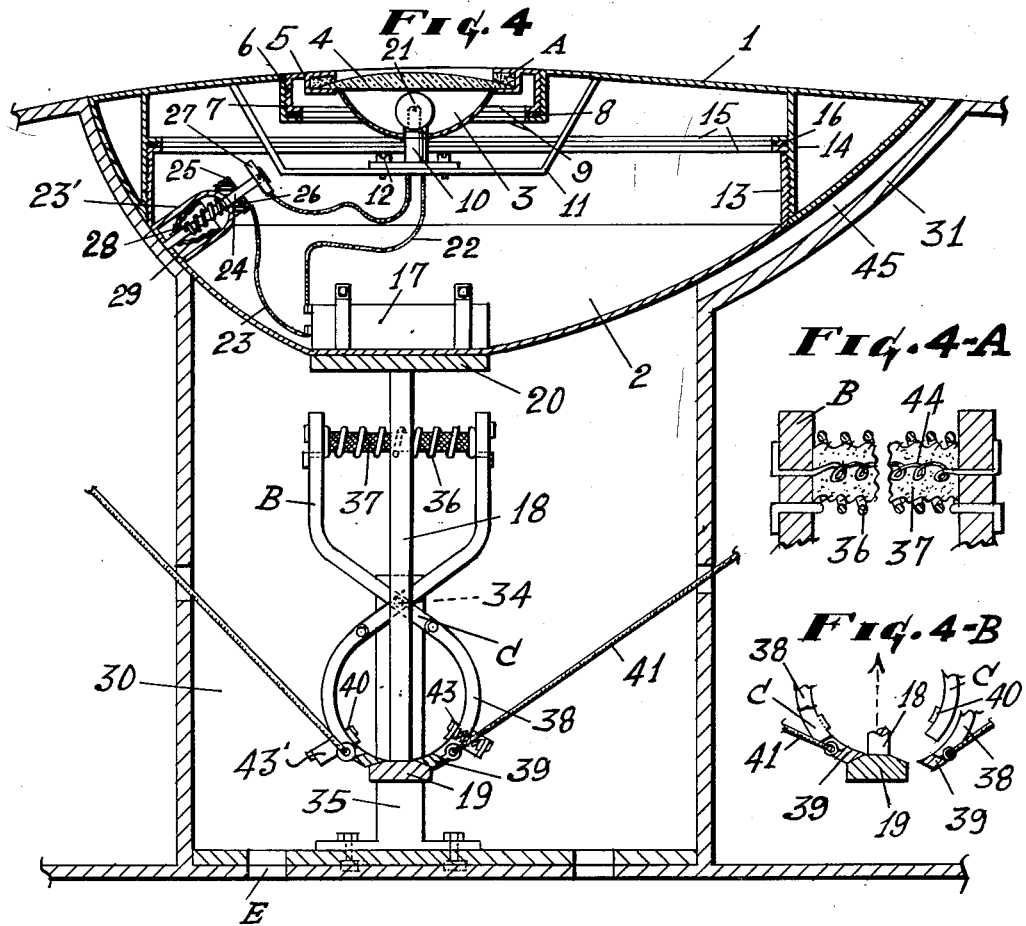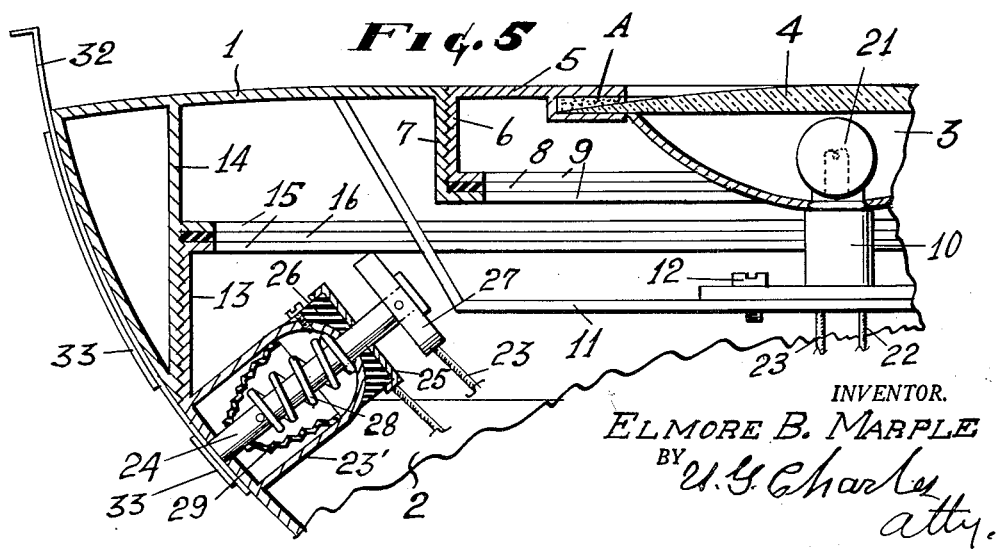

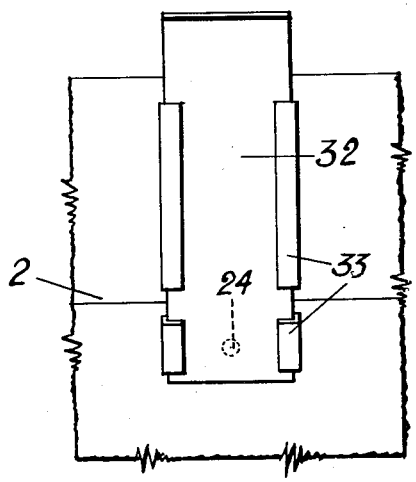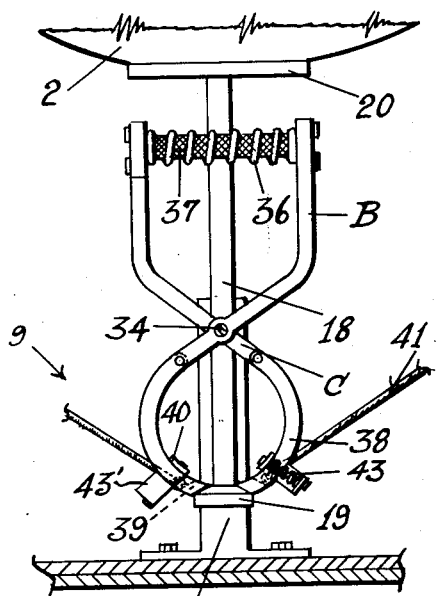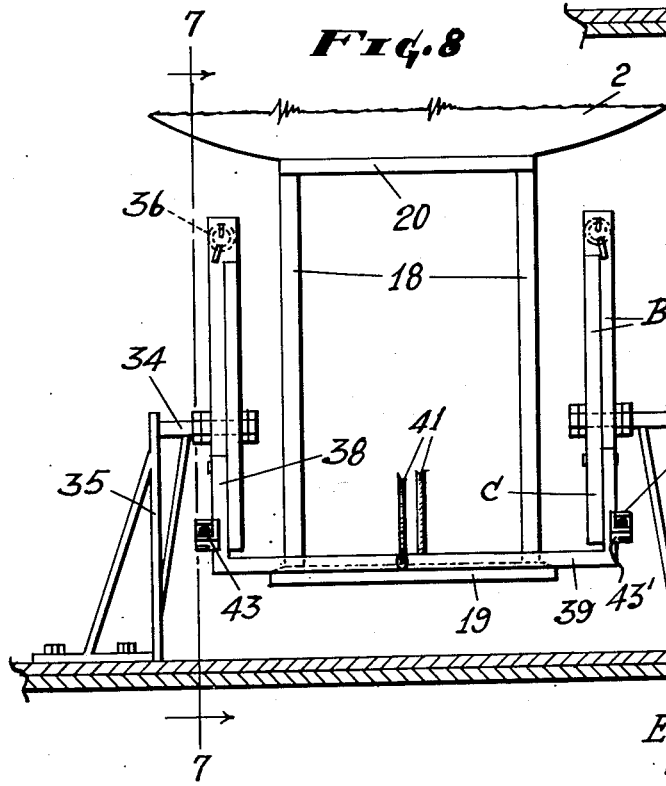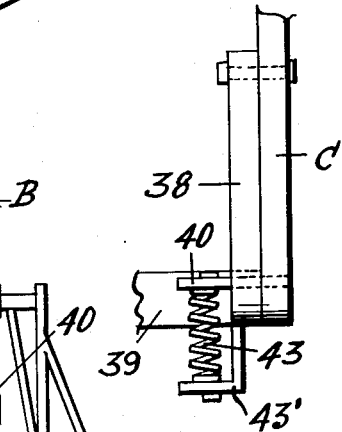

April 20, 1943. E. B. MARPLE 2,317,285
FLOAT FOR AN AIRCRAFT
Filed June 15, 1942 5 Sheets-Sheet 4
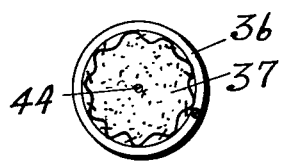
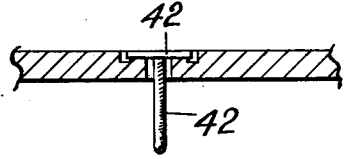
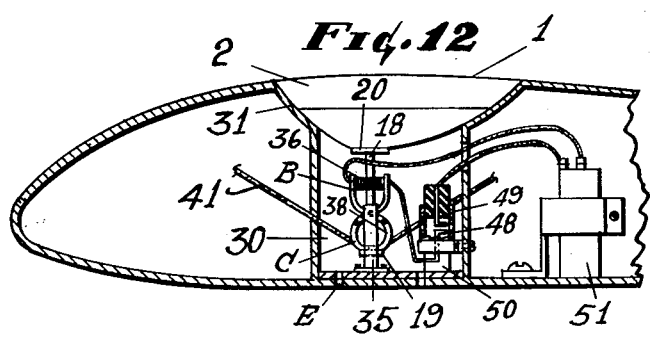
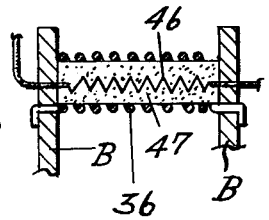
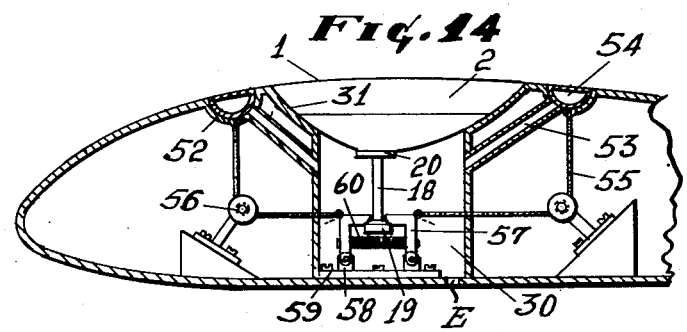
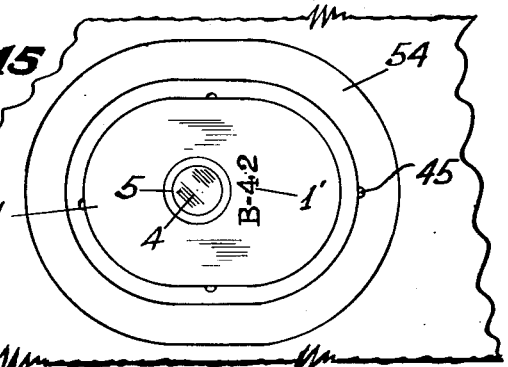
INVENTOR.
ELMORE B. MARPLE.
BY
U.G. Charles
atty.

April 20, 1943.　　E. B. MARPLE　　2,317,285
FLOAT FOR AN AIRCRAFT
Filed June 15, 1942　　5 Sheets-Sheet 5
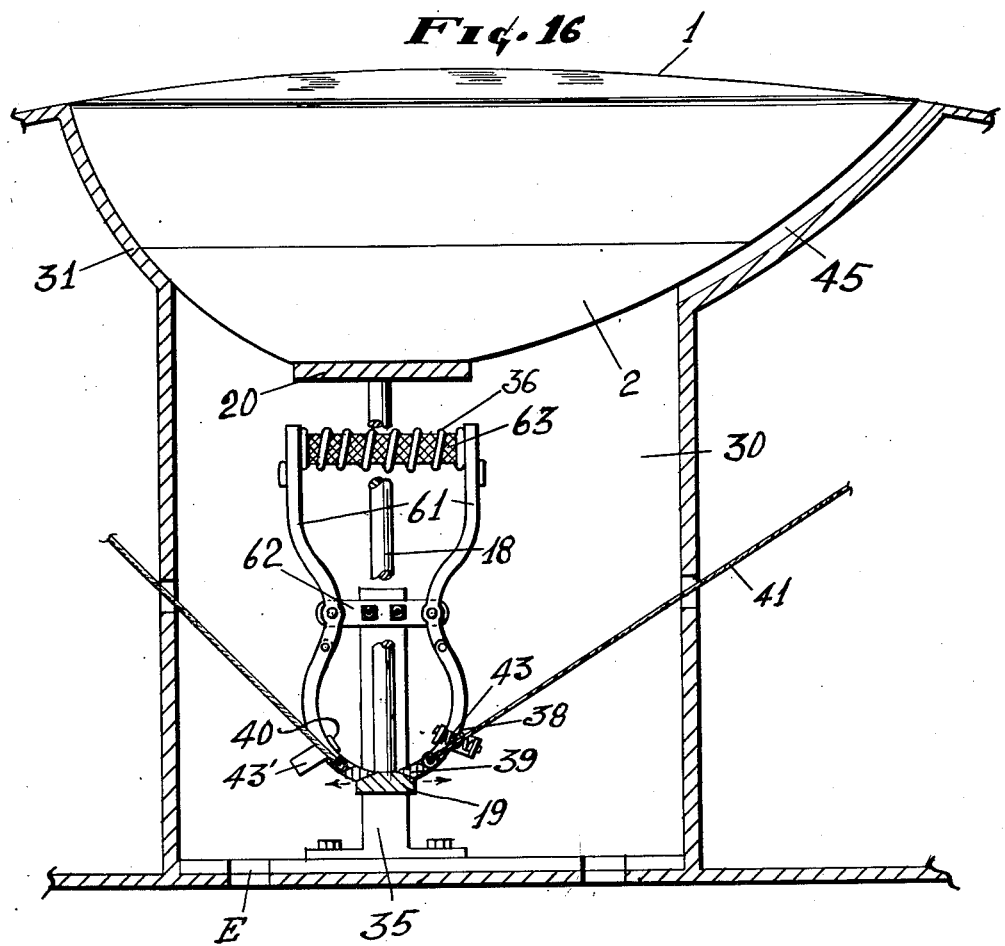
INVENTOR.
ELMORE B. MARPLE
BY Patented Apr. 20, 1943

2,317,285

UNITED STATES PATENT OFFICE 2,317,285

FLOAT FOR AIRCRAFT

Elmore B. Marple, Wichita, Kans.

Application June 15, 1942, Serial No. 447,059

3 Claims. (Cl. 9—9)

My invention relates to a float to be carried by an aircraft and has for its principal object to function as identifying means for an aircraft in case of disaster with respect to submersion, and also to reveal approximately where the aircraft submerged.

A further object of my invention is to provide a simple and efficient means to release the float from the aircraft at the time of its submersion.

A further object is to provide an illuminating means for the float to easily locate the same, said illumination being electrically or otherwise produced.

A further object of my invention is to provide an automotive releasing means for the float, the action of which is subject to its contact with the water as the aircraft sinks.

A further object of my invention is to install the float so that the outer extremity thereof will be flush with the outer surface of the wings, or fuselage, of the aircraft as a nonobstructive feature in the flight of the aircraft, and furthermore the illumination of the float as energized electrically remains disengaged until the float is detached from the aircraft.

These and other objects will hereinafter be more fully explained, reference being had to the accompanying drawings forming a part of this specification, and in which like characters will apply to like parts in the different views.

Referring to the drawings:

Fig. 4 is an enlarged sectional view through the float and its connection to the wing structure.

Fig. 5 is another sectional view enlarged sufficiently to illustrate a temporary breaker for the electrical circuit prior to installing the float.

Fig. 4—A is an enlarged fragmentary sectional view of the tong control.

Fig. 4—B is a view to illustrate the action of the tongs.

Fig. 6 is a front view of the temporary electric circuit breaker disclosed in Fig. 5.

Fig. 7 is a side view of the boat and anchoring means therefor taken on line 7—7 in Fig. 8.

Fig. 8 is a front or transverse view to that of Fig. 7.

Fig. 9 is an enlarged front view of one of the anchor tongs looking in the direction of arrow 9 in Fig. 7.

Fig. 10 is an enlarged cross sectional view of a soluble tong controlling element.

Fig. 11 is an enlarged view of one of the anchor disengaging lines and its pull plate as removably seated in the wall of the aircraft.

Fig. 12 is a view to illustrate a modified method for releasing the float by electric energy.

Fig. 13 is a sectional view of the electric heating element to liquefy by fusion the anchor control.

Fig. 14 is a view to illustrate a modified method for releasing the float by a buoyantly actuated release.

Fig. 15 is a plan view of Fig. 14.

Fig. 16 is an enlarged elevation of the float and anchor modified.

Figure 1:
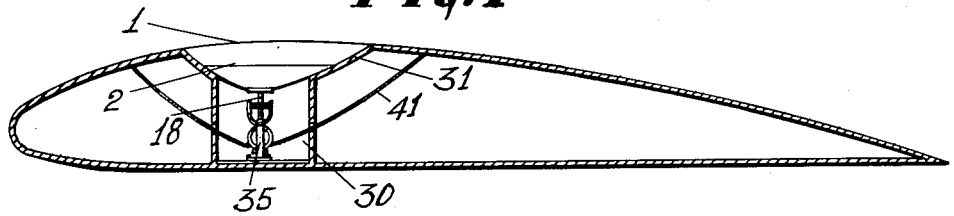
Fig. 1 is a cross section through a wing structure, showing the installation of the float.
Figure 2:
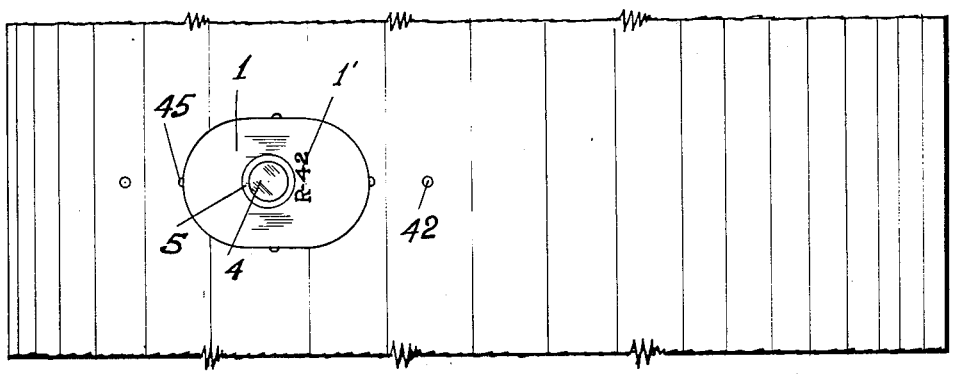
Fig. 2 is a plan view of Fig. 1.
Figure 3:
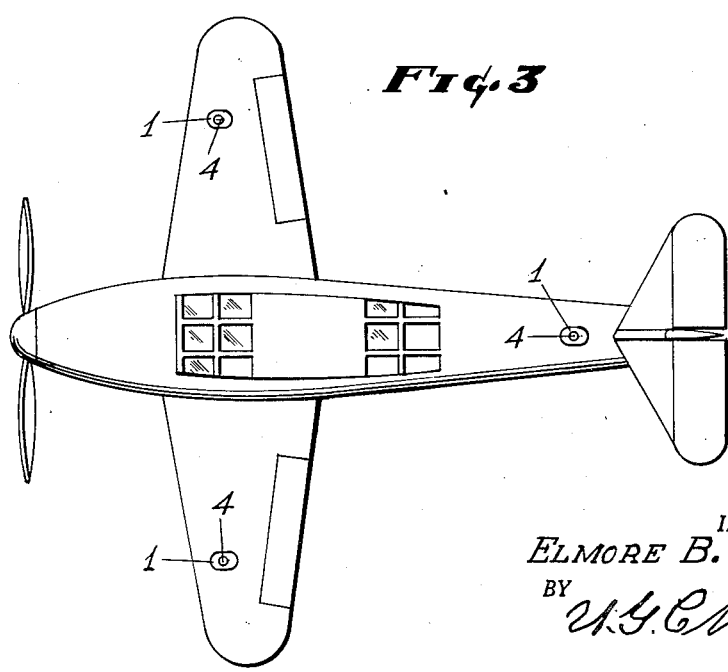
Fig. 3 is a top plan view of an aircraft to illustrate the floats as positioned in the wings and fuselage.

My invention relates to floats to be embodied in the wings, or fuselage, of an aircraft, said float having an air chamber formed by upper and lower walls 1 and 2 respectively, the lower wall being parabola in form, the peripheral edge of which extends upward and being connected to the upper wall, last said wall being crowned to align with the outer surface or contour of a wing, or fuselage in which the float is selectively positioned, said wall being of reflective nature for discernibility and having printed thereon indicia 1' as an example as shown in Figs. 2 and 15 to identify the craft from which the float was released.

Concentrically positioned in said upper wall is a concavo-convex reflector 3 extending downward into the air chamber, said reflector being open at its upper extremity and has a lens 4 to close the opening, said lens being sealed waterproof as at A. Surrounding the lenses is an annular member 5 having an annular flange portion 6 extending downward, and being threaded externally to engage with another flange 7 coinciding therewith, last said flange being integrally joined to the said upper wall, whereby the reflector may be removed but made water tight through the medium of a gasket 8 at the lower extremity of said flanges where lips 9 are provided to receive the gasket therebetween.

It will be seen in Fig. 5 that the reflector seats on a lamp socket 10, said socket being secured to a cross bar 11 by screws 12, the opposite ends of said bar being turned upward and connected to said upper wall.

It will be seen in Figs. 4 and 5 that a portion of the lower wall at its lower extremity has an annular threaded flange 13 integrally joined and to engage with another flange 14 that is likewise threaded, last said flange extending downward from the upper wall to where it meets the lower wall, by which means, the said lower extremity of the float is removable, whereby access is had to the air chamber from below. It will also be seen that each flange above referred to has an inwardly turned portion 15, 15 to function as lips and between which is positioned a gasket 16 to render the joint air tight.

Positioned in the lower removable portion of the air chamber is a battery 17 secured approximately in axial alignment with the reflector, while downwardly and outwardly extending is a pair of rods 18 as shown in Figs. 4 and 8, said rods at their lower extremity being connected by a bar 19 to function as an anchor for the float to the aircraft as later described, the rods, battery, the bar and an elongated plate 20 that is secured to the lower extremity of the lower wall functioning also as a counterbalance to insure against capsizing of the float for visibility of a lamp 21 secured in said socket, the lamp being fed by the battery, through the medium of wires 22 and 23, and having a switch in line 23 to make and break the current for said lamp, said switch being automatically controlled.

For example, I have arranged a switch having a cylindrical casing 23, one end of which is secured to the lower wall of the float, the other end being apertured to receive a plunger 24 of insulation material extending through the casing axially and through the wall of the air chamber. There is also provided a flanged washer 25 that is separated from the upper end of the casing by an insulating element 26, said element seating on the casing and on which said flanged washer is positioned, the flanged washer being of metal to contact with a metal disc 27 carried by the outer end of said plunger, by which arrangement, line 13 is severed so that each severed end will be connected to its respective disc and flange washer to close the circuit at the instance the disc contacts the flanged washer. The plunger has a spring 28 wound thereon as closing means for the switch, and the circuit being broken by retraction of the plunger when the float is installed in the body at a selected point in the aircraft. Positioned in the casing and surrounding the plunger and spring is a flexible pooch 29, one end being connected to the casing, while the other end is connected to the plunger, each connection being water tight and the plunger being free to move longitudinally without deterioration.

It will be understood that a tubular housing 30 is formed to surround the anchor to function as a flood and chamber anchor, and has at its upper end arcuate flanges 31 on which the float will seat and being secured by the anchor later described; the float being so positioned will disengage the switch. There is also provided a temporary circuit disengaging element which consists of a plate 32 slidably engaging between inturned guides 33 as shown in Fig. 6, the guides being secured to the lower wall of the float and by inserting the plate therein is means to disengage the switch similarly as when the float is installed in the aircraft. This arrangement is convenient to avoid current consumption when the float is in stock prior to its installation in an aircraft, at which time the plate is removed.

The anchoring means for the float to the aircraft above referred to consists of two pairs of tong structures, each being rockably connected on a bearing pin 34 that is supported by brace members 35 that are connected to the lower wall of the wing structure; however, other suitable means may be provided for the bearing. Each pair of tongs from their pivot carrying point upward has arm portions B and is provided with a coil spring 36 to rock a portion C of the tongs below their bearing from each other but maintained to engagement toward each other by a soluble element 37 as a means to retain the spring compressed, said soluble element being between the arm portions of the tongs and being within the convolutions of the spring whereby expansion of the spring exerts its power upon the soluble element but free to expand when the soluble element is dissolved by water flooding the tubular housing submerging the element at which instance the tongs are released to free the float for its buoyant capacity to rise and float on the surface of the water and being discharged from the aircraft and circuit will close, illuminating the lamp.

Each tong portion has a rockable member 38 connected to one side thereof; the rockable member of each oppositely disposed pair has a bar 39, the ends of which are connected to their respective rockably mounted member 38 of the tongs, said bar beveled to coincide with the bevel of the anchor bar 19 and adapted to engage thereon as shown in Fig. 4—B, while its adjacent portion C of the tong has a lugged striker 40 on the inner edge thereof as moving means for the bar carrying members when the soluble element is dissolved. To detach the float from the aircraft manually the rockable bars 39 are moved from each other by their respective cords 41 that extend upward therefrom and available at the surface externally of the craft as shown in Fig. 11, there being a disc 42 embedded loosely in the surface as manipulating means for the cords as said cords are attached thereto, and when the cords are released each pivotally connected tong member is retracted to registry by a spring 43, one end of which is connected to the rockable tong member through the medium of L-shaped member 43' while the other end is connected to the striker 40 whereby the rockable tong members are independenly rocked outward to free the anchor bar 19 which may be moved upward and outward from the craft as indicated by the arrow in Fig. 4—B. Otherwise in the case of disaster, the said bars 39 are moved from each other by the expansion of said spring at the time of dissolving the soluble element positioned within the convolutions of the spring; in this instance, all tong portions are moved simultaneously outward to disengage the anchor bar. Said soluble element connecting the arms of the tongs has a malleable wire coil 44 wound therein, the opposite ends of the coil being secured to their respective arms of the tongs, the coil being free to expand when the substance is dissolved.

It will be understood that the soluble structure will not flex as the end portion of the coil extends axially from each end thereof and does not act upon its convolutions until the solidified substance is dissolved by water that is free to flow into the tubular housing through ducts 45 communicating therewith flooding the tubular housing. In the event of a rainfall, water may enter the housing through said ducts in small quantity but free to pass therefrom through apertures E in the bottom thereof, or shell of the craft on which the housing seats, and the said apertures or ducts either of which may function as an exhaust for air when the float is submerged as in the case of disaster.

The releasing means for the float may be accomplished by a modified electric system shown in Figs. 12 and 13 by installing a connection for the arms to tension the same inward toward each other which in turn will close the anchor heretofore described, and the anchor being released in the case of emergency by a heating coil 46 extending through a substance 47 subject to being melted by fusion, the current being closed by a pair of electrodes 48 oppositely extending inward of a glass tube 49 which is apertured and subject of being filled with water to close a circuit between said electrodes, said electrodes each being axially supported by a cork 50 to close the ends of the tube. By this arrangement when the float is submerged the tubular housing will be filled with water which in turn fills the tube to close a circuit energizing the heating coil, it being understood that a dry cell battery 51 is employed and the electric system being wired to accomplish the result of releasing the float.

It will also be seen in Figs. 14 and 15 that an annular trough 52 extends around the upper wall of the float, the trough having a plurality of ducts 53 communicating with the housing beneath the float, and the trough has an annular float 54 fitting snugly therein as sealing means for the ducts but free to move therefrom when the craft is submerged. It will be seen that the annular float has a cable 55 attached to each oppositely disposed end, each cable engaging through its respective sheave 56 that is suitably secured to the wing structure as shown in said Fig. 14, the cable being attached to the upper corner of an L-shaped member 57, the lower end of which is rockably secured to an ear 58 that is positioned on a plate 59, the latter being secured to the lower wall of the wing, and the said L-shaped members being engaged with the upper bevel portions of said bar 19 and retained thereto by a coiled spring 60, each end of which is connected to its respective L-shaped member.

It will now be seen that under the buoyancy of the annular float 54 the cables are tensioned to disengage the L-shaped members to release the float, carrying said bar therewith as a counterweight to insure an upright position of the float, whereby the indicia may be read o identify its respective aircraft and to point out approximately the place where the aircraft submerged.

In Fig. 16 is illustrated a modified method of operating the tongs, in which case, each tong member 61 is rockably arranged on a link 62 whereby each tong and its handle portion is on one side of the vertical axis between the tongs, said link being carried by the said supporting members 35. In this instance to cause engagement of the anchor bars carried by their respective tong portions, the arms are expanded from each other through the medium of a soluble element similar to that shown in Fig. 4, the spring in this case being to contract while in the other heretofore described spring was an expander to engage the anchor. The soluble element 63 illustrated in Fig. 16 is in compression under the tension of the spring, and the malleable wire coil 44 may be omitted from the element, and when the element is dissolved the anchor bars are opened by said spring, otherwise the elements of the anchor are the same as heretofore described and illustrated in Figs. 4 and 7, and such modifications may be made as lie within the scope of the appended claims.

Having fully described my invention what I claim as new and desire to secure by Letters Patent is:

1. In a float for an aircraft, a concavo-convex wall for the lower portion of the float and a crowned wall to close the concavity of said lower portion of the float whereby an air chamber is formed, a concavo-reflector in the air chamber, said reflector having an electric lamp therein, a lens to cover the reflector, said lens reflector and its lamp being concentrically positioned in the said crowned upper wall, an electric supply to illuminate the lamp and a switch to make and break a circuit for the lamp, means to anchor the float visually connected to the aircraft, and means to disengage the anchor to free the float for its removal from the aircraft.

2. In a float for an aircraft, a seat positioned in an aircraft for external communication and to receive a float seated therein, a flood chamber positioned in the aircraft in working relation to the float, duct means to supply the flood chamber with water whereby said chamber will be flooded should the aircraft be submerged, an anchor means in the flood chamber to secure the float in its seat detachably, said float being released by flooding the chamber, and electrically energized illuminating means for the float, said illuminating means being energized at the instance of releasing the float from the aircraft.

3. In a float for an aircraft of the class described, the float comprising upper and lower walls secured together to form an air chamber, a reflector positioned in the float, a lens carried by the upper wall in registry with the reflector, illuminating means for the reflector, a flood and anchor containing chamber and being positioned at a selected point on the aircraft externally, a seat joined to the flood and anchor chamber, the seat opening outward from a point selectively on the aircraft and in which the float will seat, an anchor element comprised of a stationary portion secured in said flood and anchor chamber, and another portion of the anchor pendantly carried by the lower wall of the float, means to cause engagement of the said two anchor members to secure the float in its seat, and means to release the anchor members from each other by flooding the anchor chamber, these being peripherally of the float seat to permit water entering the said flood and anchor chamber.

ELMORE B. MARPLE.